United States Patent
Bongardt et al.

(10) Patent No.: US 7,172,635 B2
(45) Date of Patent: Feb. 6, 2007

(54) FUEL ADDITIVES

(75) Inventors: Frank Bongardt, Meersbusch (DE); William Hodgson, Marlow (GB); Alan Rae, West Sussex (GB); Jurgen Roder, Dusseldorf (DE)

(73) Assignees: AAE Technologies International plc, Cork (IE); Cognis Deutschland GmbH and Co. KG, Dusseldorf (DE)

( * ) Notice: Subject to any disclaimer, the term of this patent is extended or adjusted under 35 U.S.C. 154(b) by 33 days.

(21) Appl. No.: 10/475,411

(22) PCT Filed: Apr. 26, 2002

(86) PCT No.: PCT/GB02/01867

§ 371 (c)(1),
(2), (4) Date: Jun. 2, 2004

(87) PCT Pub. No.: WO02/088280

PCT Pub. Date: Nov. 7, 2002

(65) Prior Publication Data

US 2004/0200137 A1    Oct. 14, 2004

(30) Foreign Application Priority Data

Apr. 27, 2001    (GB) ................... 0110354.8

(51) Int. Cl.
*C10L 1/18*     (2006.01)
*C10L 1/224*    (2006.01)

(52) U.S. Cl. ................. 44/385; 44/418; 44/301; 44/302

(58) Field of Classification Search ........... 44/418, 44/385, 301, 302
See application file for complete search history.

(56) References Cited

U.S. PATENT DOCUMENTS

| 3,955,940 | A | * | 5/1976 | Hollyday, Jr. ............... 44/394 |
| 4,110,283 | A | | 8/1978 | Capelle |
| 5,393,791 | A | * | 2/1995 | Roberts ..................... 514/762 |
| 5,580,567 | A | * | 12/1996 | Roberts ..................... 424/405 |

FOREIGN PATENT DOCUMENTS

| DE | 29 40 782 A1 | 4/1981 |
| EP | 0 957 152 A1 | 11/1999 |
| EP | 1 227 143 A1 | 7/2002 |
| GB | 2 217 229 A1 | 10/1989 |
| WO | WO-98/17745 A1 | 4/1998 |
| WO | WO-99/20715 A1 | 4/1999 |
| WO | WO-99/35215 A2 | 7/1999 |
| WO | WO-99/44732 A1 | 9/1999 |
| WO | WO-99/52996 A1 | 10/1999 |
| WO | WO-00/31216 A1 | 6/2000 |
| WO | WO-00/36055 A1 | 6/2000 |
| WO | WO-01/10982 A1 | 2/2001 |

* cited by examiner

Primary Examiner—Cephia D. Toomer
(74) Attorney, Agent, or Firm—Darby & Darby

(57) ABSTRACT

There is described a fuel additive composition comprising an oleic alkanolamide and an alkoxylated oleic acid. There is also described a fuel composition comprising a hydrocarbon fuel and a fuel additive comprising an oleic alkanolamide and an alkoxylated oleic acid and also a method of running a combustion engine using the fuel if the invention.

28 Claims, 1 Drawing Sheet

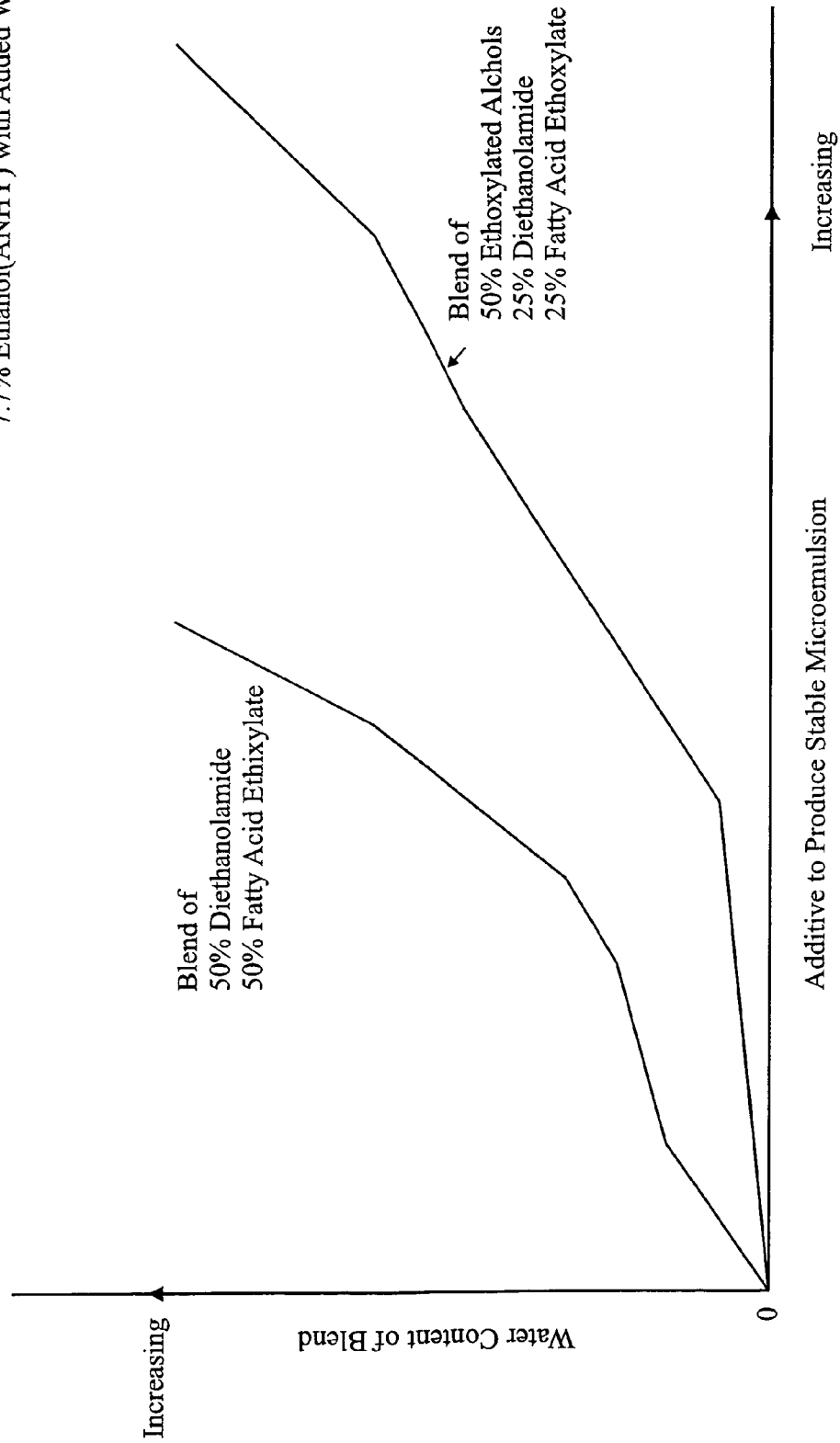

FUEL ADDITIVES

Surfactants have long had utility as additives which can affect the performance of fuels such as gasoline and diesel. British Patent No 2217229 describes a solubilising compound as a fuel additive. In particular there is described a composition comprising;
- 48 parts by volume of an alcohol ethoxylate;.
- 3–8 parts by volume of lauric diethanolamide;
- 3–8 parts by volume of oleic diethanolamide; and
- 1.5–4 parts by volume of a polyglycol ether such as ethoxylated oleic acid.

Such compositions are useful as fuel additives and enable the solubilisation of water in fuels thus reducing its potential corrosive effect. However, the compositions are disadvantageous in that, inter alia, they require a high additive to fuel ratio. Furthermore, they do not address the problems of emissions of gases such as CO, $CO_2$ and NOx.

International Patent Application No WO 98/17745 describes an alternative formulation which comprises,
- 25% w/w of a diethanolamide,
- 50% w/w of an ethoxylated alcohol, and
- 25% w/w of a fourteen carbon chain fatty acid with seven ethoxylate groups.

WO '745 especially describes fuel compositions comprising, inter alia, an additive made up of a fatty acid diethanolamide, an alcohol ethoxylate and an ethoxylate of a fatty acid, the degree of ethoxylation being selected so that a long term stable fuel composition is formed and, in particular, wherein, by carefully selecting the degree of ethoxylation, a balanced blend can be produced.

Whilst such additives provide significant reductions in emissions and are useable at low concentrations, there is still a need for a fuel composition which is capable of reducing emissions whilst maintaining performance levels and which may be even more cost effective to use.

We have now surprisingly found that a more advantageous additive can be prepared without the use of an ethoxylated alcohol Thus according to the invention we provide a fuel additive composition comprising an oleic alkanolamide and an alkoxylated oleic.

A fuel additive composition as hereinbefore described is especially characterised in that alcohols, and especially ethoxylated alcohols, are substantially absent from the composition. Therefore we provide fuel additive as hereinbefore described which is substantially free of alcohol, especially ethoxylated alcohol.

The oleic alkanolamide is preferably an ethanolamide and more preferably a diethanolamide. Especially preferred are the diethanolamides and particularly the super diethanolamides.

Generally, there are three commercial routes to alkanolamides;

Acid+alkanolamine=alkanolamide+water

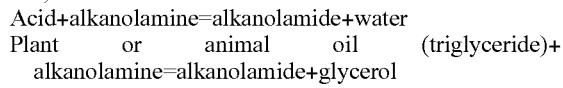

Methyl ester+alkanolamine=alkanolamide+methanol

These are listed in order of increasing product quality. The route via the acid often uses an excess of alkanolamine to produce a product higher in amide than is obtainable from the acid if a stoichiometric ratio is used; these products are sometimes referred to as super amides.

The oleic acid ethoxylate may be derived form a variety of feedstocks, readily available worldwide. However, in a preferred embodiment of the invention the oleic acid ethoxylate may be produced by ethoxylation or esterification of acids derived from animal fats e.g. beef tallow or vegetable oils, such as soya, etc. Thus the oleic acid precursor may be predominantly, e.g. from 65–70% v/v, oleic acid, but may also contain linoleic acid, e.g., 10–12% v/v, and may also include small amounts of stearic, palmitic and/or myristic acids.

The alkoxylate may be an ethoxylate or a propyloxylate or a mixture thereof. The degree of ethoxylation is chosen to optimise performance in the blend with the oleic diethanolamide and may be from 0.5 to 20, but more preferably from 0.5 to 10, more preferably from 1 to 3. A suitable product within this range would be, for example, that derived from the addition of 1 molecule of ethylene oxide to 1 mole of oleic acid.

The ratio of the oleic acid alkoxylate to the oleic alkanolamide may vary, but may be from 99:1 to 1:99 v/v, preferably 3:1 to 1:1 v/v and most preferably 1:1 v/v.

The additive of the invention may be added to any known hydrocarbon fuel, e.g. diesel, petrol or alcohol, such as ethanol, which may or may not contain water. The invention is seen to particularly good effect when added to fuels based on low fraction oils.

Thus according to a further feature of the invention we provide a fuel composition comprising a hydrocarbon fuel and a fuel additive as hereinbefore described.

The concentration of the additive in the fuel composition may vary depending, inter alia, upon the nature of the fuel, however, the concentration can be very low, typically of the order of from 0.5:1000 to 50:1000 v/v, preferably from 1:1000 to 50:1000 v/v, preferably 1:100 to 5:100 v/v.

The hydrocarbon fuel may comprise any known hydrocarbon fuel or mixtures thereof, therefore such fuels include but shall not be limited to diesel, e.g., petroleum diesel or biodiesel, gasoline, aviation fuel, alcohol, etc.

In one embodiment of the fuel composition of the invention the hydrocarbon fuel is a petroleum diesel fuel. Such fuels may generally be obtained from the distillation of petroleum and its efficiency can be measured by the cetane number. Suitable diesel fuels for use in accordance with the invention generally have a cetane number of from 35 to 60, preferably from 40 to 50. The amount of diesel fuel blended to form the fuel composition of the invention may be from 60% v/v to 95% v/v, based on the total volume of the fuel consumption. The diesel may comprise petroleum diesel, biodiesel or biodiesel blended with petroleum diesel in any ratio of from 99:1 to 1:99 v/v.

Preferably, when the fuel of the invention is blend of biodiesel and a petroleum diesel it may comprise up to 50% v/v biodiesel, for example from 1 to 50% v/v, preferably from 5 to 30% v/v, more preferably from 10 to 20% v/v.

In a further feature of the invention the hydrocarbon fuel, such a diesel or gasoline may include an amount of an oxygenator, e.g. alcohol, an alkanol, such as ethanol. When an alcohol is present the amount of alcohol may vary depending, inter alia, upon the nature of the fuel, but may in an amount of from 1 to 50% v/v, preferably 5 to 20% v/v.

For fuels, ethanol may be produced from fossil fuel feedstocks or by fermentation of sugars derived from grains or other biomass materials. Therefore, ethanol suitable for use in accordance with the fuel compositions of the invention may be fuel grade ethanol derived from yeast or bacterial fermentation of starch-based sugars. Such starch-based sugars may be extracted from corn, sugarcane, tapioca and sugar beet. Alternatively, fuel grade ethanol may be produced via known dilute and/or concentrated acid and/or enzymatic hydrolysis of a particular biomass material for example, from waste industrial sources including, cellulosic portions of municipal solid waste, waste paper, paper sludge, saw dust. Biomass may also be collected from agricultural residues including, for example, rice husks and paper-mill sludge.

A suitable fuel grade ethanol for use in accordance with the invention may contain none or only contaminant levels of water. Alternatively, a suitable fuel grade ethanol for use in accordance with the invention may contain higher amounts of water, up to 5% w/w (hydrous ethanol).

Use of ethanol in combination with a diesel fuel has previously posed problems wherein the ethanol/diesel fuel mixture would undesirably separate into two distinct phases, especially when water is present, and render the resultant mixture unsuitable for use as a combustible fuel. The use of the fuel additives of the invention permits hydrous ethanol to be blended satisfactorily with conventional diesel fuel without forming two phases. The use of fuel grade ethanol blended in accordance with the invention imparts desirable combustion characteristics to the overall fuel composition; such as improved fuel stability, lower smoke and particulate matter, lower CO and NOx emissions, improved antiknock characteristics, and/or improved anti-freeze characteristics.

When the fuel compositions of the invention are described, the absence of alcohol from the fuel additive compositions should not be construed as meaning that alcohol, e.g. ethanol, is absent from the fuel composition.

The presence of the additive of the invention ensures that the fuel composition forms a consistent stable homogenous composition and creates a monolayer simultaneously a result of which leads to a better more complete burn which reduces pollution and increases miles per gallon.

As a result a blended fuel, particularly alcohol based, is able to combust more precisely with a cooler charge to reduce the iron-formates present from the aldehyde peracids and peroxide reactions normally attributable to engine degradation.

In a further aspect of the invention we provide a fuel composition comprising a liquid hydrocarbon fuel and a surfactant composition as hereinbefore described.

In the fuel composition of the invention the hydrocarbon fuel, may be any conventionally known fuel, e.g. gasoline, diesel, biodiesel, etc. Furthermore the fuel of the invention may, optionally, include an oxygenator. The oxygenator may be an alcohol, such as ethanol. When an oxygenator such as ethanol is present, the amount of ethanol in the fuel may vary and may be from 0 to 25% v/v ethanol, preferably from 1 to 10% v/v ethanol.

We further provide a method of running an internal combustion engine comprising the use of a fuel composition of the invention.

International Patent Application No. WO99/35215, Wenzel, describes an additive for combustible fuels which includes a nitrogen source, such as urea Whilst the additive is said to reduce NOx, the compositions are very complex and include numerous ingredients, including:

a water soluble alcohol,
a C6 to C12 alcohol,
a C6 to C18 ethoxylated alcohol,
a C10 to C24 fatty acid, and
a nitrogen source.

We have now surprisingly found that the aforementioned additives are suitable for use in very low fuel:additive ratios in combination with nitrogenous compounds such as urea.

Thus according to the invention we provide a fuel additive composition comprising an oleic alkanolamide, an alkoxylated oleic acid as hereinbefore described and a nitrogen compound.

The nitrogen compound may be selected from the group consisting of ammonia, hydrazine, alkyl hydrazine, dialkyl hydrazine, urea, ethanolamine, monoalkyl ethanolamine, and dialkyl ethanolamine wherein alkyl is independently selected from methyl, ethyl, n-propyl or isopropyl. Urea is preferred. The nitrogen compound may be an anhydrous compound or a hydrous compound, e.g. an aqueous solution, and may be up to a 5% w/w aqueous solution.

According to a yet further feature of the invention we provide a method of solubilising a nitrogen compound in a fuel composition which comprises mixing a hydrocarbon fuel, a nitrogen compound and a fuel additive as hereinbefore described. The method of the invention may optionally include the addition of an alcohol, such as ethanol or water, as hereinbefore described.

We also provide the use of a nitrogen compound in the manufacture of a fuel additive of the invention. We especially provide the use of urea in the manufacture of a fuel additive of the invention.

We further provide a fuel composition comprising a hydrocarbon fuel, a fuel additive as hereinbefore described and a nitrogen compound.

In the fuel composition in this aspect of the invention the nitrogen compound may be added by being incorporated into the fuel additive or may be added separately. Furthermore, the nitrogen compound may be added as an aqueous solution.

A particular advantage of the present invention over the prior art is that fuel compositions may be prepared which are substantially anhydrous, save for trace water contamination. By the term trace water contamination we generally mean 0.1% w/w water or less.

Thus, according to a yet further feature of the invention we provide the use of urea in the manufacture of a fuel composition as hereinbefore described.

The fuel additive or the fuel composition of the invention may also optionally comprise a cetane booster in amount of from 0.1% v/v to 10% v/v, based on the volume of the mixture. When a cetane booster is included in the fuel composition of the invention it may be added as part of the fuel additive of the invention or it may be added separately.

A suitable cetane booster for use in the mixture is selected from the group comprising, 2-ethylhexyl nitrate, tertiary butyl peroxide, diethylene glycol methyl ether, cyclohexanol, and mixtures thereof. The amount of cetane booster present in the mixture is a function of the cetane value of the particular diesel fuel and the amount of ethanol present in the particular fuel composition. Generally, the lower the diesel fuel cetane value, the higher the amount of the cetane booster. Similarly, because ethanol typically acts as a cetane depressant, the higher the concentration of ethanol in the solution, the more cetane booster may be necessary in the mixture.

The fuel additives of the invention are advantageous in that, inter alia, they are more efficient at producing micro emulsions than prior art additives. Therefore, they are capable of more efficiently producing a stable, clear and homogeneous solution with a hydrocarbon fuel, e.g. diesel/ethanol, even in the presence of water. Therefore, according to a further feature of the invention we provide a fuel composition as hereinbefore described, which optionally includes an amount of water, and wherein the fuel consists of a substantially stable, substantially clear and substantially homogeneous solution.

Furthermore, the fuel additive or the fuel composition of the invention may also optionally include a demulsifier in an amount of less than 5% v/v and preferably less than 1% v/v based on the volume of the mixture.

A measure of when a fuel composition is at or near its cloud point is the conductivity of the fuel. For example, water has a conductivity of 100 mS cm$^{-1}$ and an alcohol, e.g. ethanol, a conductivity of 20 to 30 mS cm$^{-1}$. Fuels, such as gasoline or diesel, being non-polar, have a conductivity of substantially zero. Furthermore, we have found that a non-homogenous mixture of a fuel, such as gasoline or diesel, optionally including an alcohol, such as ethanol, as hereinbefore described, will have a relatively high conductivity reading, and as homogeneity is approached, the conductivity will reduce and will reach a minimum when the composition is a clear homogenous solution.

Thus according to a further feature of the invention we provide a method of determining the homogeneity of a fuel composition which comprises measuring the conductivity of the composition.

The conductivity may be measured at varying temperatures. However, we have found that measuring at substantially ambient temperature is preferred and particularly at 25.1° C. Conductivity values given hereinafter generally relate to such values when measured at 25.1° C. Furthermore, since it is known that conductivity may vary with temperature, any conductivity values taken at differing temperatures should be calibrated as if measured at 25.1° C.

We especially provide a method of determining the homogeneity of a fuel composition which comprises a fuel and an oxygenator.

The preferred additive of this invention is a non-ionic surfactant and preferably a blend of surfactants. It is a preferred feature of this invention that the surfactants be selected by their nature and concentration that, in use, the additive (as well as any water or other non-fuel liquid present) be solubilised within the fuel. For this purpose it is convenient to have regard to the hydrophilic-lipophilic (HLB) of the surfactant, the value being calculated according to the expression.

$$HLB = \frac{\text{mol. wt of hydrophilic chain} \times 20}{\text{total mol. wt.}}$$

The values will depend on the length of the hydrophilic chain, typically an ethoxylate chain. The length of the chain will increase the extent of solubilisation because of a greater ability to solubilise.

The invention has the ability to unify the HLB requirements of any liquid fuel which in turn allows for one dose to be used in any fuel from C5 carbon chains up. The benefit being the amount of treatment directly related to the co-solvency ability.

The invention will now be illustrated, but in no way limited, with reference to the accompanying examples.

EXAMPLE 1

Preparation of Compositions

An additive composition was made up by blending constituents, the super diethanolamide of oleic acid ethoxylated oleic acid in the ration 1:1. 1% of this composition was added to 7.7% ethanol/92.3% diesel blends, including certification diesel, US No 1 diesel, 10% aromatic diesel containing 0.1% cetane improver resulting in optically clear and stable micro-emulsion fuels. These were tested as automotive fuels on a 1991 Detroit Diesel Series 60 engine using the EPA (USA Environmental Protection Agency) heavy duty engine certification test as described in the Code of Federal Regulations, Title 40, Part 86, Subpart N.

Toxic exhaust gas omissions were measured and compared with those of the base un-additised diesels. Significant reductions were obtained of toxic gases CO, $CO_2$, NOx and particulate matter and the results are shown in Tables I–III.

EXAMPLE 2

Test Protocol

Blends were made up of diesel, anhydrous ethanol and water added in concentrations up to 5% v/v. The cloudy blends were then titrated against the additive until clear, stable, micro-emulsions were formed. The volume of additive required to micro-emulsify the diesel/ethanol/water blend was plotted against water content and is shown in FIG. 1. The relative efficiency of additives can be compared using this test protocol.

FIG. 1 shows a comparison of the performance of an additive comprising oleic diethanolamide and an ethoxylated oleic acid in a 1:1 ratio compared with an additive of the prior art comprising a fatty acid ethoxylate a diethanolamide and an ethoxylated alcohol in a ratio of 1:1:2.

EXAMPLE 3

Petroleum Diesel/Biodiesel/Ethanol Blend

A blend was made of certification diesel, biodiesel and ethanol, stabilised with the surfactant additive described in Example 1. Emission tests showed reductions in CO, NOx and particulate matter compared with base diesel.

EXAMPLE 4

Petroleum Diesel/Ethanol/Urea Blend

Example A solution of 0.25% urea in ethanol was blended in a 7.7:92.3 ratio with US No 1 diesel and 1.0% of the additive described in Example 1, was added to produce a clear micro-emulsion automotive fuel. Tests using this blend showed that toxic gas emissions were again lower than the base fuel, the urea having made a contribution to the reductions obtained.

EXAMPLE 5

Gasoline/ethanol Blends

Blends were made up of EPA and CARB gasolines with various amounts of ethanol e.g. a typical blend contained 90% v/v gasoline and 10% ethanol. Small amounts, typically 1% v/v of the additive of the invention were added to the gasoline/ethanol blends and the resulting fuels tested as automotive fuels and the exhaust emissions compared with those of the base gasolines. The results confirmed that ethanol/gasoline blends combust to give lower levels of toxic gas emissions.

TABLE I

No. 1 Diesel Comparisons

| FUEL | Map | BHP-hr | THC g/BHP-hr | NOx g/BHP-hr | CO g/BHP-hr | $CO_2$ g/BHP-hr | PM g/BHP-hr |
|---|---|---|---|---|---|---|---|
| Cert Fuel Philips No. 1 | | 21.256 | 0.090 | 4.512 | 3.849 | 562.56 | 0.196 |
| Deviance | | 0.000 | 0.000 | 0.000 | 0.000 | 0.000 | 0.000 |
| Philips No 2 (for comparison) | | 21.733 | 0.057 | 4.648 | 5.013 | 567.61 | 0.262 |
| Deviance from Cert | | 2.24% | −36.67% | 3.01% | 30.24% | 0.90% | 33.67% |
| Cert + 7.7% AAE blend + 2000 EHN | | 20.940 | 0.163 | 4.425 | 3.092 | 558.74 | 0.142 |
| Deviance from Cert | | −1.49% | 81.11% | −1.93% | −19.67% | −0.68% | −27.55% |

TABLE II

10% Aromatic Diesel (CARB Equivalent) Comparisons

| FUEL | Map | BHP-hr | THC g/BHP-hr | NOx g/BHP-hr | CO g/BHP-hr | $CO_2$ g/BHP-hr | PM g/BHP-hr |
|---|---|---|---|---|---|---|---|
| Cert Fuel Philips No. 2 | | 21.733 | 0.057 | 4.648 | 5.013 | 567.61 | 0.262 |
| Deviance | | 0.000 | 0.000 | 0.000 | 0.000 | 0.000 | 0.000 |
| Cert + 7.7% AAE blend + 1000 EHN | | 21.538 | 0.094 | 4.668 | 3.777 | 565.00 | 0.174 |
| Deviance from Cert | | −0.90% | 64.91% | 0.43% | −24.66% | −0.46% | −33.59% |
| Cert + 8.7% AAE blend + 11.3% Bio + 1000 EHN | | 21.350 | 0.098 | 4.630 | 3.789 | 565.67 | 0.161 |
| Deviance from Cert | | −1.76% | −71.93% | −0.39% | −24.42% | −0.34% | −38.55% |

TABLE III

10% Aromatic Diesel (CARB Equivalent) Comparisons

| FUEL | Map | BHP-hr | THC g/BHP-hr | NOx g/BHP-hr | CO g/BHP-hr | $CO_2$ g/BHP-hr | PM g/BHP-hr |
|---|---|---|---|---|---|---|---|
| Cert Fuel Philips 10% Aromatic | | 21.757 | 0.050 | 4.318 | 4.714 | 554.78 | 0.249 |
| Deviance | | 0.000 | 0.000 | 0.000 | 0.000 | 0.000 | 0.000 |
| Cert plus AAE05 only | | 21.735 | 0.041 | 4.332 | 4.885 | 556.88 | 0.245 |
| Deviance from Cert | | −0.10% | −18.00% | 0.32% | 3.63% | 0.38% | −1.61% |
| Cert + 7.7% AAE blend + 1000 EHN | | 21.402 | 0.122 | 4.365 | 3.527 | 556.14 | 0.150 |
| Deviance from Cert | | −1.63 | 144.00% | 1.09% | −25.18% | 0.25% | −39.76% |
| Cert + 7.7% AAE blend + 2000DTBP | | 21.272 | 0.116 | 4.344 | 3.670 | 559.34 | 0.161 |
| Deviance from Cert | | −2.23% | 132.00% | 0.60% | −22.15% | 0.82% | −35.34% |

The invention claimed is:

1. A fuel composition comprising a diesel fuel and a fuel additive, wherein the fuel additive comprises an oleic alkanolamide and an alkoxylated oleic acid wherein the additive is substantially free of ethoxylated alcohol.

2. A fuel composition according to claim 1 wherein the oleic alkanolamide is an ethanolamide.

3. A fuel composition according to claim 2 wherein the oleic ethanolamide is a diethanolamide.

4. A fuel composition according to claim 1 wherein the alkoxylated oleic acid is an ethoxylated oleic acid, propyloxylated oleic acid or a mixture thereof.

5. A fuel composition according to claim 4 wherein the alkoxylated oleic acid is an ethoxylated oleic acid.

6. A fuel composition according to claim 4 wherein the degree of alkoxylation is from 0.5 to 10 mol of alkoxylate to 1 mol of oleic acid.

7. A fuel composition according to claim 6 wherein the degree of alkoxylation is 1 mol of alkoxylate to 1 mol of oleic acid.

8. A fuel composition according to claim 1 wherein the oleic alkanolamide comprises a diethanolamide and the alkoxylated oleic acid comprises an ethoxylated oleic acid and wherein the ratio of oleic diethanolamide to ethoxylated oleic acid is from 99:1 to 1:99 v/v.

9. A fuel composition according to claim 8 the ratio of oleic diethanolamide to ethoxylated oleic acid is 1:1.

10. A fuel composition according to claim 1 wherein the composition includes an amount of water.

11. A fuel composition according to claim 1 wherein the additive to fuel ratio is from 0.5–50:1000 v/v.

12. A fuel composition according to claim 11 wherein the additive to fuel ratio is from 1:1000 to 50:1000 v/v.

13. A fuel composition according to claim 12 wherein the additive to fuel ratio is from 1 to 5:1000 v/v.

14. A fuel composition according to claim 1 wherein the diesel fuel is a petroleum diesel.

15. A fuel composition according to claim 14 wherein the diesel fuel is a blend of petroleum diesel and biodiesel.

16. A fuel composition according to claim 14 wherein the diesel fuel is a biodiesel.

17. A fuel composition according to claim 14 wherein the fuel is a mixture of diesel and an alcohol.

18. A fuel composition according to claim 17 wherein the alcohol is ethanol.

19. A fuel composition according to claim 17 wherein the fuel is a hydrous ethanol/diesel blend.

20. A fuel composition according to claim 19 wherein the additive to fuel ratio is up to 5% v/v.

21. A fuel composition according to claim 17 wherein the fuel is an anhydrous ethanol/diesel blend.

22. A fuel composition according to claim 1 further including a nitrogen compound.

23. A fuel composition according to claim 22 wherein the nitrogen compound is selected from the group consisting of the ammonia, hydrazine, alkyl hydrazine, dialkyl hydrazine, urea, ethanolamine, monoalkyl ethanolamine, and dialkyl ethanolamine, wherein the alkyl is independently selected from methyl, ethyl, n-propyl or isopropyl.

24. A fuel composition according to claim 23 wherein the nitrogen compound is urea.

25. A method of manufacturing a fuel composition according to claim 1 comprising the steps of:
providing a DIESEL fuel, adding the fuel additive of claim 1 and adding a nitrogen compound.

26. The method according to claim 25 wherein the nitrogen compound is urea.

27. A fuel composition according to claim 1 wherein the fuel composition also comprises a cetane booster in amount of from 0.1% v/v to 10% v/v.

28. A fuel composition according to claim 1 wherein the additive also comprises a demulsifier in an amount of less than 5% v/v.

* * * * *